United States Patent
Reeves

(10) Patent No.: US 11,973,548 B2
(45) Date of Patent: Apr. 30, 2024

(54) ADJUSTING A CONFIGURATION OF A WIRELESS TELECOMMUNICATION NETWORK

(71) Applicant: T-Mobile USA, Inc., Bellevue, WA (US)

(72) Inventor: Raymond E. Reeves, Orlando, FL (US)

(73) Assignee: T-Mobile USA, Inc., Bellevue, WA (US)

(*) Notice: Subject to any disclaimer, the term of this patent is extended or adjusted under 35 U.S.C. 154(b) by 158 days.

(21) Appl. No.: 17/592,409

(22) Filed: Feb. 3, 2022

(65) Prior Publication Data
US 2023/0246676 A1    Aug. 3, 2023

(51) Int. Cl.
| | |
|---|---|
| H04B 7/04 | (2017.01) |
| H04B 7/0426 | (2017.01) |
| H04B 17/382 | (2015.01) |
| H04W 24/02 | (2009.01) |
| H04W 24/08 | (2009.01) |
| H04W 24/10 | (2009.01) |

(52) U.S. Cl.
CPC ........... *H04B 7/043* (2013.01); *H04B 17/382* (2015.01); *H04W 24/02* (2013.01); *H04W 24/08* (2013.01); *H04W 24/10* (2013.01)

(58) Field of Classification Search
CPC ..... H04W 24/02; H04W 24/08; H04W 24/10; H04B 7/043; H04B 17/382
USPC ........................................................ 375/262
See application file for complete search history.

(56) References Cited

U.S. PATENT DOCUMENTS

| | | |
|---|---|---|
| 5,819,177 A | 10/1998 | Vucetic et al. |
| 6,456,652 B1 | 9/2002 | Kim et al. |
| 6,463,287 B1 | 10/2002 | Wegner |
| 7,035,647 B2 | 4/2006 | De |
| 7,099,669 B2 | 8/2006 | Sheffield |
| 7,120,431 B1 | 10/2006 | Huo et al. |

(Continued)

FOREIGN PATENT DOCUMENTS

| | | |
|---|---|---|
| CN | 103369547 B | 8/2016 |
| DE | 19962216 A1 | 7/2001 |

(Continued)

*Primary Examiner* — Kevin M Burd
(74) *Attorney, Agent, or Firm* — Perkins Coie LLP

(57) ABSTRACT

The disclosed system adjusts performance of a network. The system obtains a configuration and historical performance of the network. Based on the historical performance, the system identifies a time window and a location associated with the network. Based on the configuration and the historical performance, the system identifies a parameter associated with the network, parameter adjustment, success criterion, failure criterion, and deployment duration. Based on the time window, the location, and the deployment duration, the system determines a testing time window within the time window, where the testing time window satisfies a density threshold indicating low impact to UEs associated with the network. The system deploys the parameter adjustment at the location during the testing time window, and monitors the performance of the network. The system determines whether the success or failure criterion is satisfied, and preserves the parameter adjustment or terminates the test, respectively.

20 Claims, 8 Drawing Sheets

(56) References Cited

U.S. PATENT DOCUMENTS

| | | | |
|---|---|---|---|
| 7,146,170 B2 * | 12/2006 | Davidson | H04B 7/0408 455/446 |
| 7,209,077 B2 | 4/2007 | Harper | |
| 7,283,803 B2 | 10/2007 | Karaoguz et al. | |
| 7,685,479 B2 | 3/2010 | Schoenfeld | |
| 7,949,346 B2 | 5/2011 | Capuzzello et al. | |
| 8,010,105 B2 | 8/2011 | Buckley et al. | |
| 8,112,094 B1 | 2/2012 | Wellington | |
| 8,165,109 B2 | 4/2012 | King et al. | |
| 8,249,865 B2 | 8/2012 | Birmingham | |
| 8,380,217 B2 | 2/2013 | Caldwell et al. | |
| 8,476,982 B2 | 7/2013 | Simic et al. | |
| 8,509,762 B2 | 8/2013 | Li et al. | |
| 8,515,429 B2 | 8/2013 | Quinn | |
| 8,620,370 B2 | 12/2013 | Sandberg et al. | |
| 8,644,853 B2 | 2/2014 | Moeglein et al. | |
| 8,712,340 B2 | 4/2014 | Hoirup et al. | |
| 8,712,389 B2 | 4/2014 | Joul et al. | |
| 8,737,989 B2 | 5/2014 | Luft | |
| 8,804,544 B2 | 8/2014 | Linkola et al. | |
| 8,805,295 B2 | 8/2014 | Cosimini et al. | |
| 8,897,152 B1 | 11/2014 | Caceres et al. | |
| 8,953,567 B2 | 2/2015 | Annamalai | |
| 8,954,121 B2 | 2/2015 | Kanj et al. | |
| 9,185,643 B2 | 11/2015 | Jouin | |
| 9,219,995 B2 | 12/2015 | Eric | |
| 9,326,202 B2 | 4/2016 | Barbaresi et al. | |
| 9,398,418 B2 | 7/2016 | Annamalai | |
| 9,560,548 B2 | 1/2017 | Jabbar et al. | |
| 9,578,519 B2 | 2/2017 | Jaldén et al. | |
| 9,585,037 B1 | 2/2017 | Davari et al. | |
| 9,602,345 B2 | 3/2017 | Saha et al. | |
| 9,615,265 B2 | 4/2017 | Simonsson et al. | |
| 9,641,958 B2 | 5/2017 | Lehane et al. | |
| 9,661,515 B2 | 5/2017 | Lord et al. | |
| 9,693,200 B2 | 6/2017 | Dunkin et al. | |
| 9,736,704 B1 | 8/2017 | Jain et al. | |
| 9,796,391 B2 | 10/2017 | Olson et al. | |
| 9,876,530 B2 | 1/2018 | Negus et al. | |
| 9,900,082 B1 | 2/2018 | Chowdhury et al. | |
| 9,918,271 B2 | 3/2018 | Yang et al. | |
| 10,019,302 B2 | 7/2018 | Nguyen et al. | |
| 10,039,013 B2 | 7/2018 | Periyasamy et al. | |
| 10,051,516 B2 | 8/2018 | Wentink | |
| 10,080,149 B2 | 9/2018 | Anderson et al. | |
| 10,225,746 B2 | 3/2019 | Mohammed et al. | |
| 10,292,055 B2 | 5/2019 | Carpenter et al. | |
| 10,321,334 B1 * | 6/2019 | Marupaduga | H04W 16/30 |
| 10,334,488 B2 | 6/2019 | Periyasamy et al. | |
| 10,375,585 B2 | 8/2019 | Tan et al. | |
| 10,397,043 B2 | 8/2019 | Tapia et al. | |
| 10,448,330 B2 | 10/2019 | Mcdiarmid et al. | |
| 10,645,604 B2 * | 5/2020 | Ouyang | H04B 17/29 |
| 10,681,562 B1 | 6/2020 | Ertimo et al. | |
| 10,681,573 B2 | 6/2020 | Christopherson et al. | |
| 10,728,768 B2 | 7/2020 | Senior | |
| 10,756,965 B2 | 8/2020 | He et al. | |
| 10,785,101 B2 | 9/2020 | Li et al. | |
| 10,833,782 B1 | 11/2020 | Allen et al. | |
| 10,860,570 B2 | 12/2020 | Ebel et al. | |
| 11,006,268 B1 | 5/2021 | Kim et al. | |
| 11,019,644 B2 | 5/2021 | Yang et al. | |
| 11,070,275 B1 | 7/2021 | Marupaduga et al. | |
| 11,650,996 B1 * | 5/2023 | Daianu | G06F 40/30 707/771 |
| 2005/0055578 A1 | 3/2005 | Wright et al. | |
| 2005/0143097 A1 | 6/2005 | Wilson et al. | |
| 2009/0316904 A1 | 12/2009 | Klingenbrunn et al. | |
| 2010/0284333 A1 | 11/2010 | Shirota et al. | |
| 2011/0090086 A1 | 4/2011 | Dicks et al. | |
| 2011/0093287 A1 | 4/2011 | Dicks et al. | |
| 2012/0165063 A1 * | 6/2012 | Scalia | H04B 7/0608 455/517 |
| 2013/0090122 A1 | 4/2013 | Karla et al. | |
| 2013/0258875 A1 | 10/2013 | Siomina et al. | |
| 2013/0331109 A1 | 12/2013 | Dhillon et al. | |
| 2014/0092771 A1 | 4/2014 | Siomina et al. | |
| 2014/0133375 A1 * | 5/2014 | McDiarmid | H04W 52/267 370/311 |
| 2015/0045008 A1 | 2/2015 | Karla | |
| 2016/0165472 A1 | 6/2016 | Gopalakrishnan et al. | |
| 2017/0093508 A1 | 3/2017 | Martin | |
| 2018/0146086 A1 | 5/2018 | Lantz | |
| 2019/0124524 A1 | 4/2019 | Gormley | |
| 2021/0224699 A1 | 7/2021 | Soundrarajan et al. | |
| 2021/0243072 A1 | 8/2021 | Peterson et al. | |
| 2021/0250230 A1 | 8/2021 | Johnson et al. | |
| 2021/0266777 A1 | 8/2021 | Manner et al. | |
| 2022/0135939 A1 * | 5/2022 | Alpan | G01N 1/4077 435/34 |

FOREIGN PATENT DOCUMENTS

| | | |
|---|---|---|
| EP | 1595192 A2 | 11/2005 |
| EP | 2008476 A2 | 12/2008 |
| EP | 2385725 A1 | 11/2011 |
| EP | 2621211 B1 | 4/2014 |
| EP | 2989839 A1 | 3/2016 |
| EP | 3097718 A1 | 11/2016 |
| EP | 2947910 B1 | 6/2017 |
| EP | 3437211 A1 | 2/2019 |
| EP | 3837889 A1 | 6/2021 |
| JP | 6113085 B2 | 3/2017 |
| KR | 100840399 B1 | 6/2008 |
| KR | 20110052635 A | 5/2011 |
| WO | 0131842 A2 | 5/2001 |
| WO | 2010022376 A2 | 2/2010 |
| WO | 2014176503 A1 | 10/2014 |
| WO | 2015175284 A1 | 11/2015 |
| WO | 2018178892 A1 | 10/2018 |
| WO | 2020142097 A1 | 7/2020 |
| WO | 2020230147 A1 | 11/2020 |
| WO | 2020249199 A1 | 12/2020 |
| WO | 2020249425 A1 | 12/2020 |
| WO | 2021008675 A1 | 1/2021 |
| WO | 2021013367 A1 | 1/2021 |
| WO | 2021160755 A1 | 8/2021 |

\* cited by examiner

Identify opportunities to make adjustments to the wireless telecommunication network
300

Deploy the adjustments to the wireless telecommunication network
310

Monitor the performance of the wireless telecommunication network
320

*FIG. 3*

ADJUSTING A CONFIGURATION OF A WIRELESS TELECOMMUNICATION NETWORK

BACKGROUND

In today's wireless telecommunication networks, a question always at hand is how to optimize existing resources. Coverage, in general, and road coverage, in particular, are key areas for customer experience improvements. The coverage flaws can be costly to correct. At times, simply trying out different configurations can compound coverage and experience issues. As a result, engineers can engage in an endless loop of testing different antenna configurations to improve network performance. However, the manual testing and improvement simply result in glacial activities that leave a network half-baked or moderately optimized, at best.

BRIEF DESCRIPTION OF THE DRAWINGS

Detailed descriptions of implementations of the present invention will be described and explained through the use of the accompanying drawings.

FIG. 3 shows the three stages of adjusting a configuration of a wireless telecommunication network.

Figure 1:
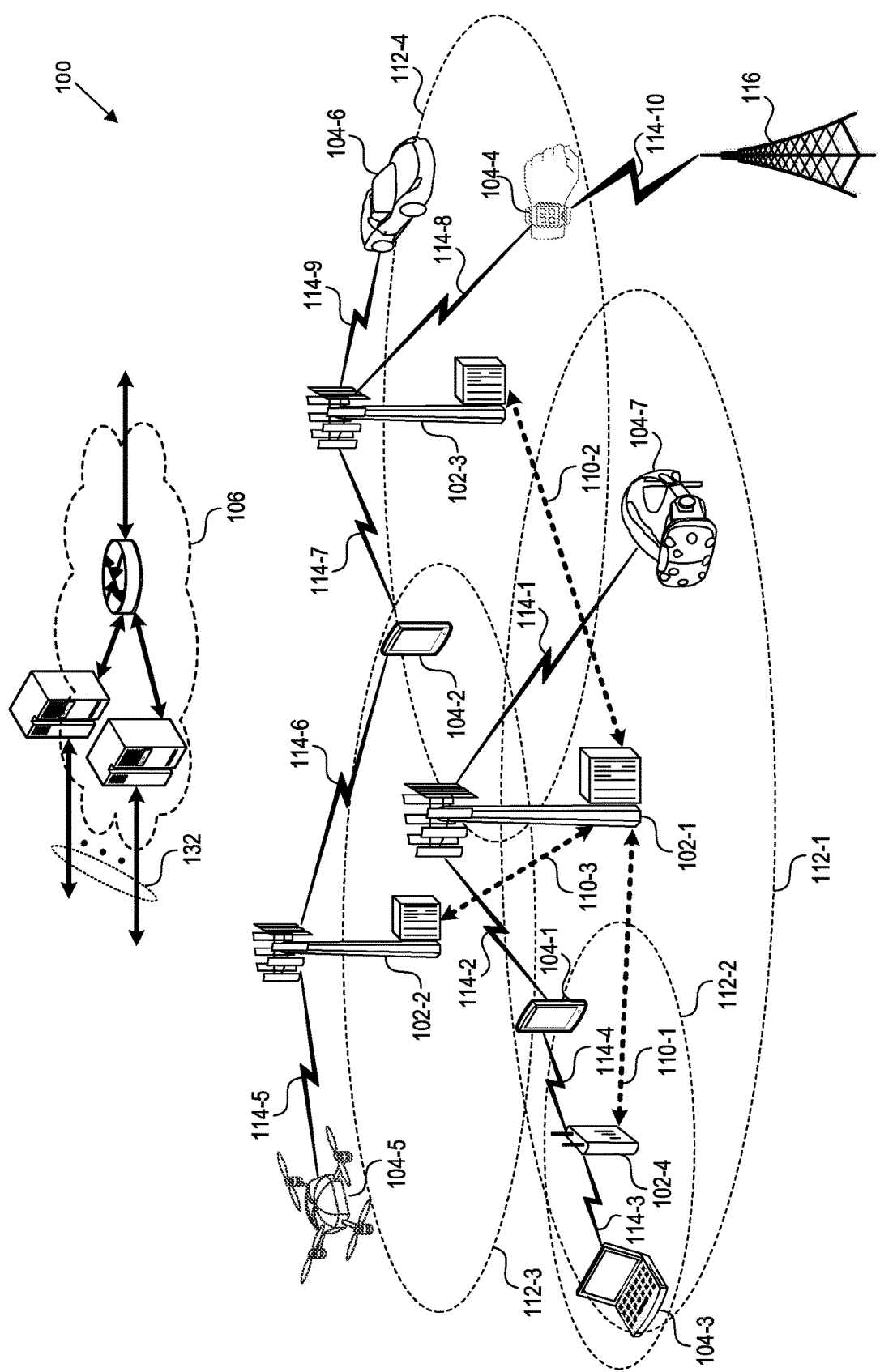
FIG. 1 is a block diagram that illustrates a wireless communications system that can implement aspects of the present technology.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Disclosed here is a system and method to adjust and test a configuration of a wireless telecommunication network ("network"). The system can obtain a configuration and a historical performance of the network. The configuration can include various parameters of the network such as tilt of an antenna, width of the antenna, power of the antenna, etc. Based on the historical performance, the system can identify a time window and a location, which indicate an undesirable quality of service associated with the network. For example, the undesirable quality of service can indicate that metrics associated with the network, such as Reference Signal Receive Power (RSRP), Reference Signal Received Quality (RSRQ), Signal to Interference and Noise Ratio (SINR), are below the predetermined thresholds. Undesirable quality of service can also include unnecessary expenditure of resources of the network.

Based on the configuration of the network and the historical performance, the system can identify a parameter of the network, an adjustment to the parameter, a success criterion, a failure criterion, and a duration of deployment. The parameter can include a tilt associated with an antenna, an azimuth associated with an antenna, a vertical beam width associated with an antenna, a horizontal beam width associated with an antenna, power of an antenna, etc. The success criterion can be a threshold indicating an improvement in the performance of the network. If the performance of the network is above the threshold, the success criterion can be satisfied. The failure criterion can include a threshold indicating a degradation in the performance of the network. If the performance of the network is below the threshold, the failure criterion is satisfied, and the deployment of the parameter adjustment can be terminated. The duration of deployment indicates a length of testing time window, such as 3 hours.

Based on the time window, the location, and the duration of deployment, the system can determine a testing time window within the time window satisfying a density threshold. The density threshold can indicate low impact to mobile devices using the network. The density threshold can include a number of mobile devices impacted by the adjustment to the parameter associated with the wireless telecommunication network, or a number of mobile devices having the undesirable quality of service associated with the wireless telecommunication network.

The system can deploy the adjustment to the parameter at the location during the testing time window. The system can monitor the performance of the wireless telecommunication network during the testing time window by monitoring metrics such as RSRP, RSRQ, SINR, and determine whether the failure criterion is satisfied. Upon determining that the failure criterion is satisfied, the system can terminate the adjustment to the parameter based on the performance of the wireless telecommunication network during the testing time window, even if the testing time window has not completed. Based on the performance of the network, the system can determine whether the success criterion is satisfied. Upon determining that the success criterion is satisfied, the system can preserve the adjustment to the parameter.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless wide area network (WWAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

Wireless devices can be integrated with or embedded in other devices. As illustrated, the wireless devices 104 are distributed throughout the network 100, where each wireless device 104 can be stationary or mobile. For example, wireless devices can include handheld mobile devices 104-1 and 104-2 (e.g., smartphones, portable hotspots, tablets, etc.); laptops 104-3; wearables 104-4; drones 104-5; vehicles with wireless connectivity 104-6; head-mounted displays with wireless augmented reality/virtual reality (AR/VR) connectivity 104-7; portable gaming consoles; wireless routers, gateways, modems, and other fixed-wireless access devices; wirelessly connected sensors that provide data to a remote server over a network; IoT devices such as wirelessly connected smart home appliances, etc.

A wireless device (e.g., wireless devices 104-1, 104-2, 104-3, 104-4, 104-5, 104-6, and 104-7) can be referred to as a user equipment (UE), a customer premise equipment (CPE), a mobile station, a subscriber station, a mobile unit, a subscriber unit, a wireless unit, a remote unit, a handheld mobile device, a remote device, a mobile subscriber station, terminal equipment, an access terminal, a mobile terminal, a wireless terminal, a remote terminal, a handset, a mobile client, a client, or the like.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

5G Core Network Functions

Figure 2:
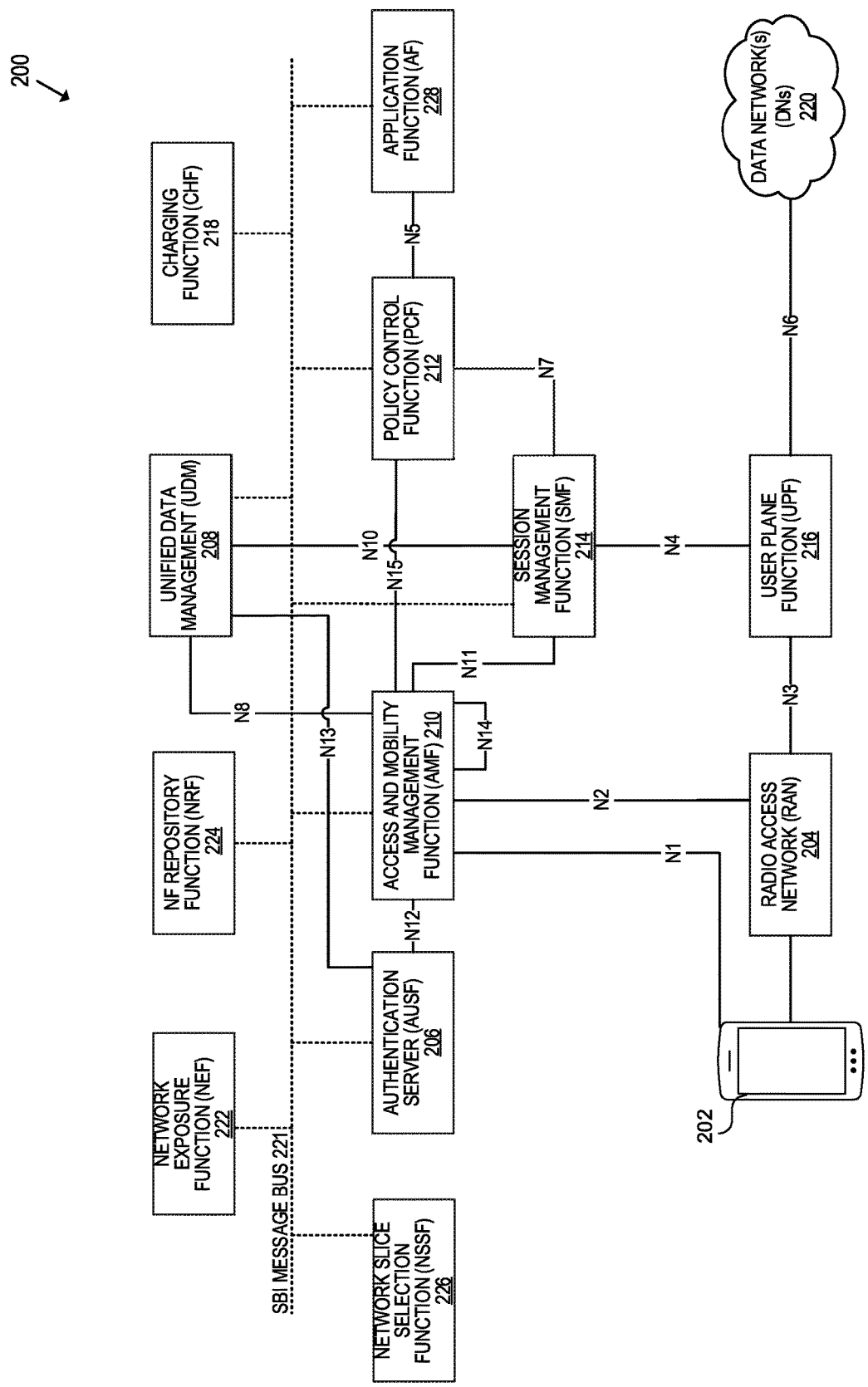
FIG. 2 is a block diagram that illustrates 5G core network functions (NFs) that can implement aspects of the present technology.

FIG. 2 is a block diagram that illustrates an architecture 200 including 5G core network functions (NFs) that can implement aspects of the present technology. A wireless device 202 can access the 5G network through a NAN (e.g., gNB) of a radio access network (RAN) 204. The NFs include an Authentication Server Function (AUSF) 206, a Unified Data Management (UDM) 208, an Access and Mobility Management Function (AMF) 210, a Policy Control Function (PCF) 212, a Session Management Function (SMF) 214, a User Plane Function (UPF) 216, and a Charging Function (CHF) 218.

The interfaces N1 through N15 define communications and/or protocols between each NF as described in relevant standards. The UPF 216 is part of the user plane and the AMF 210, SMF 214, PCF 212, AUSF 206, and UDM 208 are part of the control plane. One or more UPFs can connect with one or more data networks (DNs) 220. The UPF 216 can be deployed separately from control plane functions. The NFs of the control plane are modularized such that they can be scaled independently. As shown, each NF service exposes its functionality in a Service Based Architecture (SBA) through a Service Based Interface (SBI) 221 that uses HTTP/2. The SBA can include a Network Exposure Function (NEF) 222, an NF Repository Function (NRF) 224, a Network Slice Selection Function (NSSF) 226, and other functions such as a Service Communication Proxy (SCP).

The SBA can provide a complete service mesh with service discovery, load balancing, encryption, authentication, and authorization for interservice communications. The SBA employs a centralized discovery framework that leverages the NRF 224, which maintains a record of available NF instances and supported services. The NRF 224 allows other NF instances to subscribe and be notified of registrations from NF instances of a given type. The NRF 224 supports service discovery by receipt of discovery requests from NF instances and, in response, details which NF instances support specific services.

The NSSF 226 enables network slicing, which is a capability of 5G to bring a high degree of deployment flexibility and efficient resource utilization when deploying diverse network services and applications. A logical end-to-end (E2E) network slice has predetermined capabilities, traffic characteristics, and service-level agreements, and includes the virtualized resources required to service the needs of a Mobile Virtual Network Operator (MVNO) or group of subscribers, including a dedicated UPF, SMF, and PCF. The wireless device 202 is associated with one or more network slices, which all use the same AMF. A Single Network Slice Selection Assistance Information (S-NSSAI) function operates to identify a network slice. Slice selection is triggered by the AMF, which receives a wireless device registration request. In response, the AMF retrieves permitted network slices from the UDM 208 and then requests an appropriate network slice of the NSSF 226.

The UDM 208 introduces a User Data Convergence (UDC) that separates a User Data Repository (UDR) for storing and managing subscriber information. As such, the UDM 208 can employ the UDC under 3GPP TS 22.101 to support a layered architecture that separates user data from application logic. The UDM 208 can include a stateful message store to hold information in local memory or can be stateless and store information externally in a database of the UDR. The stored data can include profile data for subscribers and/or other data that can be used for authentication purposes. Given a large number of wireless devices that can connect to a 5G network, the UDM 208 can contain voluminous amounts of data that is accessed for authentication. Thus, the UDM 208 is analogous to a Home Subscriber Server (HSS), to provide authentication credentials while being employed by the AMF 210 and SMF 214 to retrieve subscriber data and context.

The PCF 212 can connect with one or more application functions (AFs) 228. The PCF 212 supports a unified policy framework within the 5G infrastructure for governing network behavior. The PCF 212 accesses the subscription information required to make policy decisions from the UDM 208, and then provides the appropriate policy rules for enforcement by the control plane functions. The SCP (not shown) provides a highly distributed multi-access edge compute cloud environment and a single point of entry for a cluster of network functions, once they have been successfully discovered by the NRF 224. This allows the SCP to become the delegated discovery point in a datacenter, offloading the NRF 224 from distributed service meshes that make up a network operator's infrastructure. Together with the NRF 224, the SCP forms the hierarchical 5G service mesh.

The AMF 210 receives requests and handles connection and mobility management while forwarding session management requirements over the N11 interface to the SMF 214. The AMF 210 determines that the SMF 214 is best suited to handle the connection request by querying the NRF 224. That interface and the N11 interface between the AMF 210 and the SMF 214 assigned by the NRF 224 both use the SBI 221. During session establishment or modification, the SMF 214 also interacts with the PCF 212 over the N7 interface and the subscriber profile information stored within the UDM 208. Employing the SBI 221, the PCF 212 provides the foundation of the policy framework which, along with the more typical quality of service and charging rules, includes network slice selection, which is regulated by the NSSF 226.

Adjusting a Configuration of a Network

FIG. 3 shows the three stages of adjusting a configuration of a network. The performance, e.g., the quality of service, provided by the network 100 in FIG. 1 to the UEs 104 in FIG. 1 varies based on time of day, events in the vicinity, and/or geography in the vicinity. For example, during rush hour, the cell towers associated with the network 100 providing service to the highways serve more UEs than during off-peak hours. In another example, if a ten-story commercial tower is built in place of a small store and is close to the cell tower, the quality of service provided by the cell tower degrades. In other words, quality of service provided by the network 100 varies based on time and/or location.

The disclosed system can adjust the configuration of the network 100 to improve performance of the network based on the time and/or the location. The performance of the network 100 can be measured using performance metrics such as RSRP, RSRQ, SINR, etc.

RSRP is the average received power of a single reference signal resource element. RSRP does a better job of measuring signal power from a specific sector while potentially excluding noise and interference from other sectors.

RSRQ indicates the quality of the received reference signal. The RSRQ measurement provides additional information when RSRP is not sufficient to make a reliable handover or cell reselection decision. SINR measures signal quality: the strength of the wanted signal compared to the unwanted interference and noise.

To adjust the configuration of the network 100, the system can suggest adding components such as towers, sectors, and/or antennas, removing components, and/or adjusting parameters. The parameters can include tilt of the antenna, azimuth of the antenna, power of the antenna, and a vertical and horizontal beam width. In addition, the parameters can include features that can be enabled or disabled, such as Multiple Input Multiple Output (MIMO), Time Division Duplex (TDD), Frequency Division Duplex (FDD), or Wi-Fi.

To determine the adjustments to make to the network 100, the system can operate in three stages, or phases, 300, 310, 320. In stage 300, the system can identify opportunities to make adjustments to the network 100 while reducing negative impact to the UEs 104 served by the network. The opportunities can include a time and a location associated with the network 100 during which the UE 104 experience can be improved. In addition, in stage 300 the system can identify the time during which to deploy the adjustments to the network 100 to reduce the number of UEs 104 impacted by the adjustment. The system can identify the time to deploy the adjustments based on a threshold. The threshold can indicate that the UE 104 experience cannot deteriorate more than 50% by the adjustments, and/or that no more than 50% of the peak number of UEs served by the network 100 are affected by the adjustments.

For example, if the location is suburban, the system can decide to make the adjustments in the middle of the night, when less than 50% of the peak number of UEs are active. In another example, if the location is the Las Vegas strip, the system can determine to make the adjustments in the middle of the morning, when less than 50% of the peak number of UEs are active.

In stage 310, the system can deploy the adjustments to the network 100 at the determined time and location. In stage 320, the system can monitor the performance of the network 100, by gathering metrics such as RSRP, RSRQ, SINR, etc., while the adjustments are deployed. Based on the performance, the system can determine whether to make the adjustments to the network 100 permanent, or to run more tests.

Figure 4A:
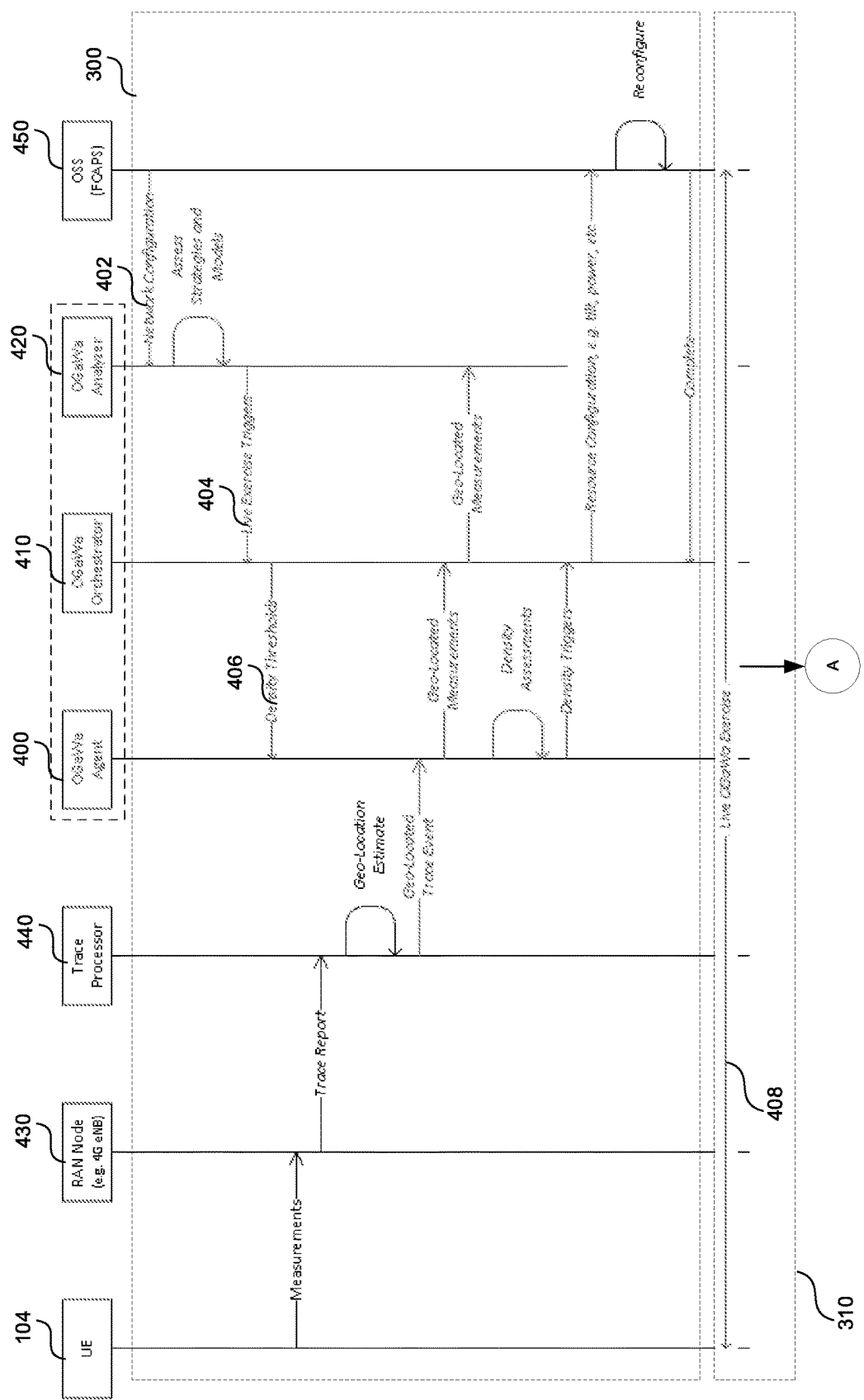
FIGS. 4A-4B show the steps to deploy adjustments to the network.
Figure 4B:
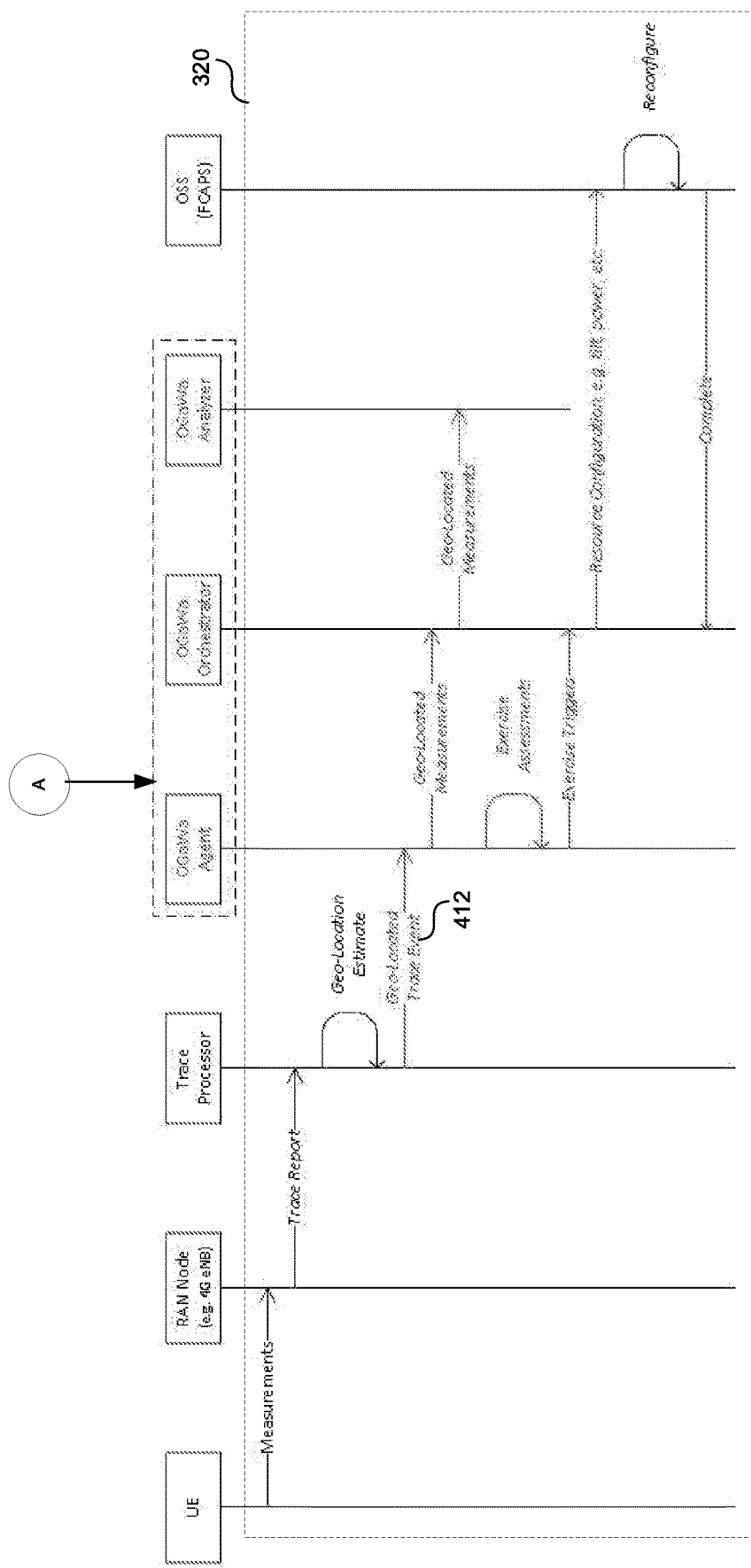

FIGS. 4A-4B show the steps to deploy adjustments to the network. The disclosed system includes the following components: an overshooting games of war (OGaWa) agent ("agent") 400, an OGaWa orchestrator ("orchestrator") 410, and an OGaWa analyzer ("analyzer") 420. The disclosed system can interface with the UE 104 and the network 100 components such as a RAN node 430, a trace processor 440, and an operations support system (OSS) 450. OSS is a software component that enables a service provider to monitor, control, analyze, and manage the services on its network.

In step 402, the analyzer 420 can obtain a network configuration of the network 100 and a historical performance associated with the network.

In step 404, based on the historical performance, the analyzer 420 can identify live exercise triggers, namely, a time window and a location, where the time window and the location indicate an undesirable quality of service associated with the network 100.

The undesirable quality of service can include a physical measurement of a signal received by the UE, such as RSRP, RSRQ, and/or SINR, which is below a predefined threshold. In addition, the undesirable quality of service can indicate inadequate responsiveness of the network. Inadequate responsiveness of the network can depend on the UE's actions. For example, if the UE is sending emails via the network, inadequate responsiveness of the network can mean that there is a delay of 6 hours in delivering the email. In another example, if the UE is watching videos via the network, the inadequate responsiveness of the wireless communication network can mean that there is a delay of a second in providing the next frame of the video.

Based on the configuration associated with the network and the historical performance, the analyzer 420 can identify one or more parameters ("parameter") associated with the network and an adjustment to the parameter. The parameter can include a tilt associated with an antenna, an azimuth associated with an antenna, a power associated with an antenna, a vertical beam width associated with an antenna, and a horizontal beam width associated with an antenna.

To identify the parameter to adjust, the analyzer 420 can use analytic models or simulations. Analytic models can provide formulas expressing relationships between parameters and performance metrics. Based on the analytic models, the analyzer 420 can determine the parameter to adjust and the magnitude of adjustment. Similarly, the analyzer 420 can run simulations of the operation of the network 100 when an adjustment to the parameter is made. Based on the analytic models and/or the simulations, the analyzer 420 can obtain expected performance metrics associated with the network 100.

In one embodiment, if the performance metrics exceed a predetermined threshold, such as a 20% gain in performance of the network, the analyzer 420 can stop further investigation into possible network configurations, and deploy the network configuration with the expected 20% gain in performance. In another embodiment, if the performance metrics are below the predetermined threshold, but above a selection threshold, such as 5% gain in performance, the analyzer 420 can pass the adjustment to the orchestrator 410, and also continue to test other adjustments to the network 100. In a third embodiment, the analyzer 420 can select a percentage of the best-performing configurations, such as top 10%, and send the request to the orchestrator 410 to create an exercise for each of the best-performing configurations.

In addition, the analyzer 420 can suggest the duration of deployment, such as 3 hours, 6 hours, 3 days. The analyzer 420 can also determine success and failure criteria.

The success criteria can include improvement to the performance of the network 100 of no less than a predetermined threshold, such as 15%. If the improvement to the performance of the network 100 is 15% or higher, the adjustment to the parameter is preserved. The success criteria can include improvement to the performance of the network 100 between a predetermined range, such as 3% and 15%. If the improvement to the performance of the network 100 is between 3% and 15%, the analyzer 420 can determine to run the adjustment at a later date, to ensure that the improvement is repeatedly observable. If the analyzer 420 determines that the improvement is repeatedly observable, the analyzer 420 can preserve the adjustment to the parameter. Even if improvement is not within the predetermined range, but improvement is repeatedly observable, the analyzer 420 can decide to preserve the adjustment to the parameter.

The failure criteria can include that a performance metric decreased by a predetermined percentage, such as 50%. The failure criteria can include an emergency event, such as a terrorist attack, a natural disaster, a car crash, etc. The failure criteria can include that more than a predetermined number of customers of a particular type are negatively affected by the adjustment to the parameter. For example, the predetermined number of customers can be one and the particular type can be a high-value customer such as a legislator. If any of the failure criteria are met, the agent 400 can terminate the adjustment to the parameter, even if the duration of deployment has not expired. For example, if the duration of deployment is indicated as 3 hours, but in the first 30 minutes, RSRP falls below a predetermined failure threshold, the agent 400 can terminate the deployment, and revert the parameter to the configuration prior to the adjustment.

In step 406, based on the time window, the location, and the duration of deployment, the orchestrator 410 can determine a testing time window within the time window satisfying a density threshold. The density threshold indicates low impact to UEs associated with the network 100. For example, the density threshold can specify off-peak hours during which to deploy the adjustment, by specifying that if 50% or less of the peak number of UEs are active on the network 100, the adjustment can be deployed. In another example, the density threshold can specify that if a predetermined percentage of users (such as 30% of users) are experiencing inadequate service (such as performance metrics below specified thresholds), adjustment can be deployed. In a third example, the density threshold can specify that if at most 60% of the peak number of UEs active on the network 100 are affected by the adjustment, the adjustment can be deployed. Steps 402, 404, 406 can be performed in stage 300.

In step 408, stage 310, the agent 400, upon receiving instruction from the orchestrator 410, deploys the changes at the specified time and place.

In step 412, stage 320, the trace processor 440 can gather measurements associated with the UE 104 and correlate them to a geolocation to generate multiple geo-located trace events. A trace event includes a unique identifier or a UE, the cell towers that the UE can see, the geolocation, the unique identifier of the cell serving the UE, and the measurements of the signal provided by the cell, such as RSRP, RSRQ, SINR. The unique identifier of the UE can be International Mobile Equipment Identity.

In step 414, the analyzer 420 can receive the measurements associated with the UE 104, and can determine whether the success or failure criteria have been met. If success criteria are met, the analyzer 420 can keep the configuration changes. If failure criteria are met, the analyzer can revert the network configuration to the configuration prior to deploying the changes. The OSS 450 can change the network configuration.

If the time window and the location during which the configuration change needs to be made occurs when the network 100 is busy, such as 8:00 p.m. in Las Vegas or New York City, the analyzer 420 can make the configurations change in small stages, and test the performance of the network 100 after each stage. For example, the analyzer 420 can reduce the magnitude of the parameter adjustment in each stage to be 10% of the desired magnitude. In addition, each stage can be a fraction of the duration of the deployment. For example, if the desired duration of the deployment is 3 hours, each stage can last 3 minutes. After each small stage, e.g., lasting 3 minutes, the system can determine the impact on the network 100. The system can include a failure criterion, such as a negative impact to the network. For example, the failure criterion can include a threshold degradation in RSRP, RSRQ, and/or SINR. If after each small stage, the degradation does not exceed the threshold degradation, the system can implement the next small stage.

Figure 5A:
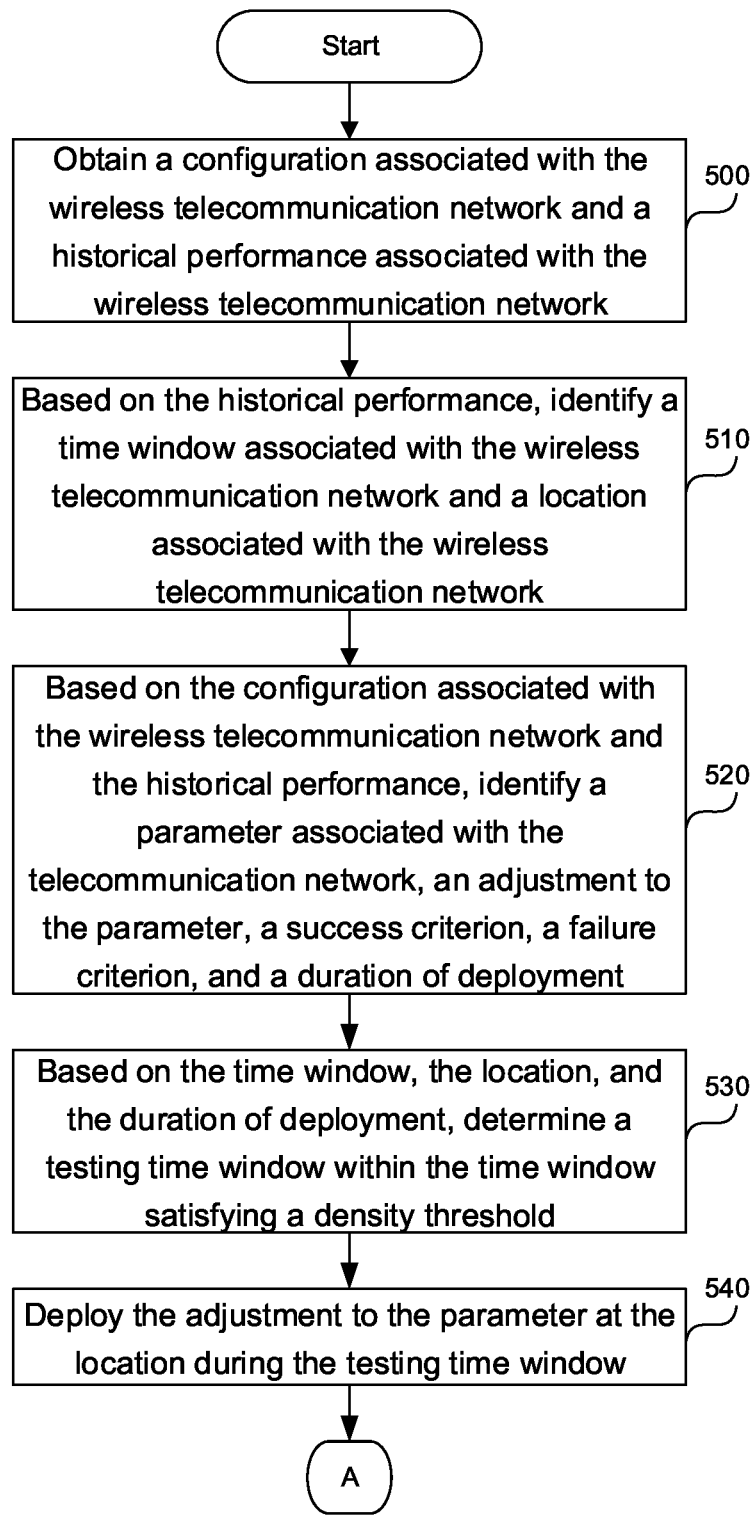
FIGS. 5A-5B show a flowchart of a method to adjust and test a configuration of a wireless telecommunication network.
Figure 5B:
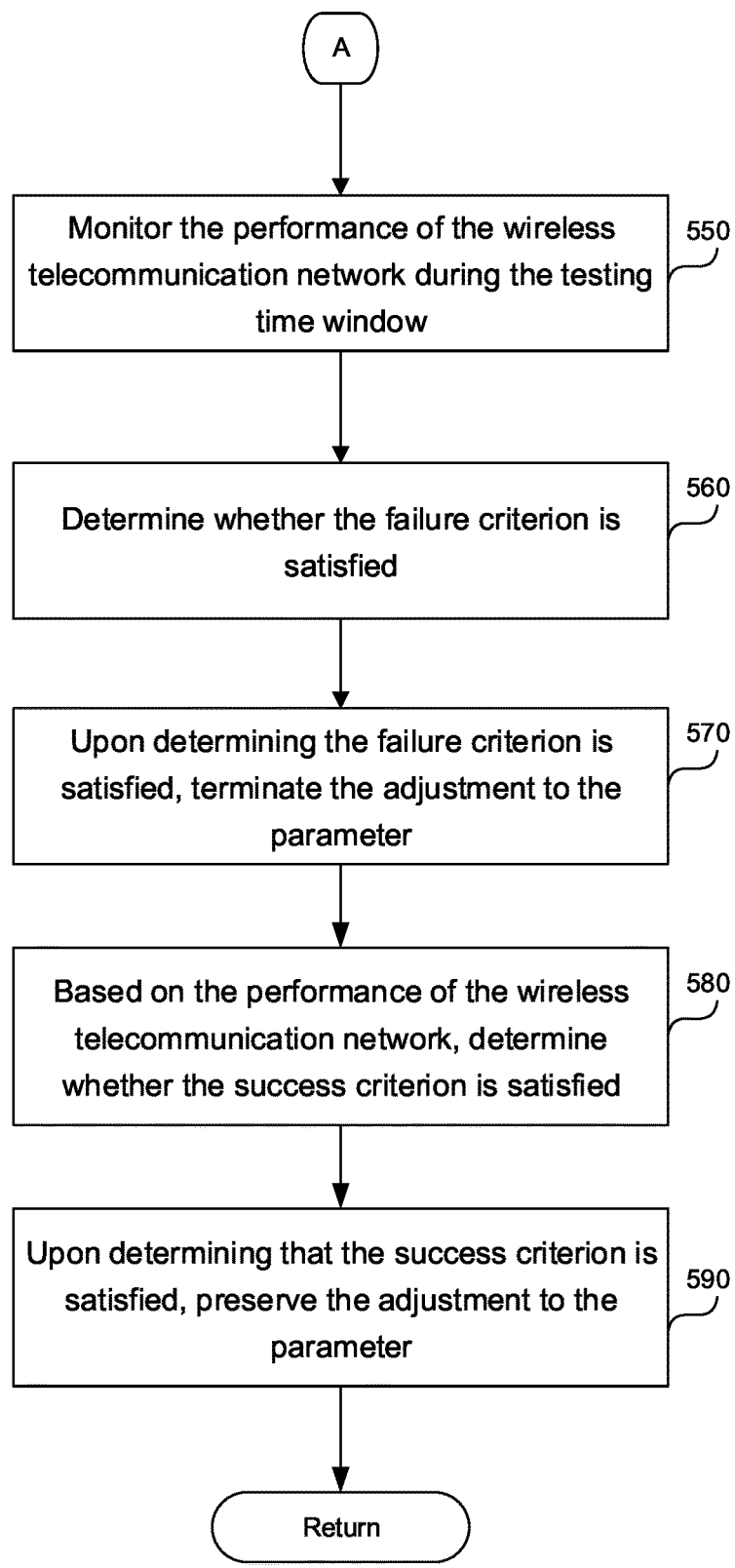

FIGS. 5A-5B show a flowchart of a method to adjust and test a configuration of a network. A hardware or software processor implementing instructions described in this application can, in step 500, obtain a configuration associated with the network and a historical performance associated with the network.

In step 510, based on the historical performance, the processor can identify a time window associated with the network and a location associated with the network. The time window and the location indicate an undesirable quality of service associated with the network. The undesirable quality of service can include undesirable measurements of metrics such as RSRP, RSRQ, SINR, etc. The undesirable quality of service can also include unnecessary expenditure of resources. For example, an unnecessary expenditure of resources can occur when too many cell towers are serving an area with few users. In another example, an unnecessary expenditure of resources can occur when an area has satisfactory coverage, but each antenna is operating at the highest power setting.

In step 520, based on the configuration associated with the network and the historical performance, the processor can identify a parameter associated with the network, an adjustment to the parameter, a success criterion, a failure criterion, and a duration of deployment. The parameter can include a tilt associated with an antenna, an azimuth associated with an antenna, a vertical beam width associated with an antenna, a horizontal beam width associated with an antenna, power associated with an antenna, etc. The duration of deployment can indicate a length of testing time window.

In step 530, based on the time window, the location, and the duration of deployment, the processor can determine a testing time window within the time window satisfying a density threshold. The density threshold can include a number of mobile devices impacted by the adjustment to the parameter associated with the network, or a number of mobile devices having the undesirable quality of service associated with the network.

In step 540, the processor can deploy the adjustment to the parameter at the location during the testing time window. In step 550, the processor can monitor the performance of the network during the testing time window. To monitor the performance, the processor can monitor metrics such as RSRP, RSRQ, SINR, etc.

In step 560, the processor can determine whether the failure criterion is satisfied. In step 570, upon determining that the failure criterion is satisfied, the processor can terminate the adjustment to the parameter based on the performance of the network during the testing time window. The processor can terminate the adjustment to the parameter even if the testing time window has not expired.

In step 580, based on the performance of the network, the processor can determine whether the success criterion is satisfied. In step 590, upon determining that the success criterion is satisfied, the processor can preserve the adjustment to the parameter.

To identify a parameter associated with the network, an adjustment to the parameter, and a success criterion, the processor can run simulations of new configurations. The processor can obtain multiple parameters including a tilt associated with an antenna, an azimuth associated with an antenna, a vertical beam width associated with an antenna, a horizontal beam width associated with an antenna, a feature associated with an antenna, power associated with an antenna, etc. The feature can be activated or deactivated, and can include Multiple Input Multiple Output (MIMO), Time Division Duplex (TDD), Frequency Division Duplex (FDD), or Wi-Fi. For example, in 5G networks, a cellular antenna can also serve as a Wi-Fi antenna. However, if the cellular antenna is not being used for its Wi-Fi feature, the processor can determine to disable the Wi-Fi feature. Disabling the unused Wi-Fi feature is an example of adjusting the parameter based on unnecessary expenditure of resources.

In the simulation, the processor can adjust at least one parameter among the multiple parameters. The processor can simulate operation of the network upon adjusting the at least one parameter. The processor can monitor a performance of the simulated network. The processor can obtain a threshold indicating a deployable performance improvement. The processor can determine whether the performance of the simulated network exceeds the deployable performance improvement. If the performance exceeds the deployable performance improvement by a significant margin, such as by 20%, the processor can avoid performing the remainder of the simulations, and can immediately decide to deploy the adjustments associated with the current simulation. Otherwise, the processor can determine to deploy the at least one parameter that has been adjusted, and continue to run simulations of other parameter adjustments.

To identify a parameter associated with the network, an adjustment to the parameter, and a success criterion, the processor can use analytic models to evaluate parameter adjustments. The processor can obtain multiple parameters including a tilt associated with an antenna, an azimuth associated with an antenna, a vertical beam width associated with an antenna, a horizontal beam width associated with an antenna, a feature associated with an antenna, a power associated with an antenna, etc. The processor can obtain an analytic model indicating an influence of at least one parameter among the multiple parameters on the performance of the network. The processor can adjust the at least one parameter among the multiple parameters. Based on the analytic model, the processor can determine the influence of the adjustment of the at least one parameter on the performance of the network. The processor can obtain a threshold indicating a deployable performance improvement. The processor can determine whether the performance of the simulated network exceeds the deployable performance improvement. Upon determining that the performance of the network exceeds the deployable performance improvement, the processor can deploy the at least one parameter that has been adjusted. If the expected performance exceeds the deployable performance improvement by a significant margin, such as by 20%, the processor can avoid evaluating other analytic models, and can immediately decide to deploy the adjustments associated with the current analytic model.

To determine whether the success criterion is satisfied, the processor can determine how significant the improvement is, and determine whether to perform additional tests to see if the improvement is reproducible. The processor can obtain a threshold range indicating an improvement in the performance of the network. The processor can determine whether the performance of the network during the testing time window satisfies the threshold range. Upon determining that the performance of the network during the testing time window satisfies the threshold range, the processor can revert the adjustment to the parameter. Upon reverting the adjustment to the parameter, the processor can repeat the adjustment to the parameter at a later time window. The processor can determine whether the performance of the network during the later time window satisfies the threshold range. Upon determining that the performance of the network during the later time window satisfies the threshold range, the processor can preserve the adjustment to the parameter.

The processor can obtain failure criteria including a threshold associated with the performance of the network, a threshold number of impacted mobile devices and a type of mobile devices, and an emergency event. The processor can determine whether the performance of the network is below the threshold, whether the number of impacted mobile devices associated with the type of mobile devices impacted exceeds the threshold number of impacted mobile devices, or whether the emergency event occurred. Upon determining that at least one of the failure criteria is satisfied, the processor can terminate the adjustment to the parameter.

If the parameter adjustment needs to be performed at a location and time impacting many users, the processor can gradually introduce the parameter adjustment, by, for example, reducing the time window and reducing the magnitude of adjustments. Based on the time window and the location, the processor can determine whether a testing time window within the time window satisfying a density threshold exists. The density threshold can include a number of mobile devices impacted by the parameters associated with the network, or a number of mobile devices having the undesirable quality of service associated with the network.

For example, the density threshold can indicate that the number of active devices during the parameter adjustment cannot exceed a predetermined number such as 100,000 devices. However, if the time and location for the testing is 5:00 p.m. to midnight on the Las Vegas strip, such a density threshold cannot be satisfied.

Upon determining that the testing time window within the time window satisfying the density threshold does not exist, the processor can reduce the adjustment to the parameter and the duration of deployment to obtain a reduced adjustment to the parameter and a reduced testing time window. The processor can iteratively perform instructions including: deploying the reduced adjustment to the parameter at the location during the reduced testing time window; monitoring the performance of the network during the testing time window by monitoring metrics such as RSRP, RSRQ, SINR, etc.; based on the performance of the network, determining whether the success criterion is satisfied; and upon determining that the success criterion is satisfied, increasing the reduced adjustment to the parameter. The processor can perform the instructions until the success criterion or the failure criterion is satisfied. The success criterion can include a measurable improvement in the performance of the network for a predetermined amount of time.

Computer System

Figure 6:
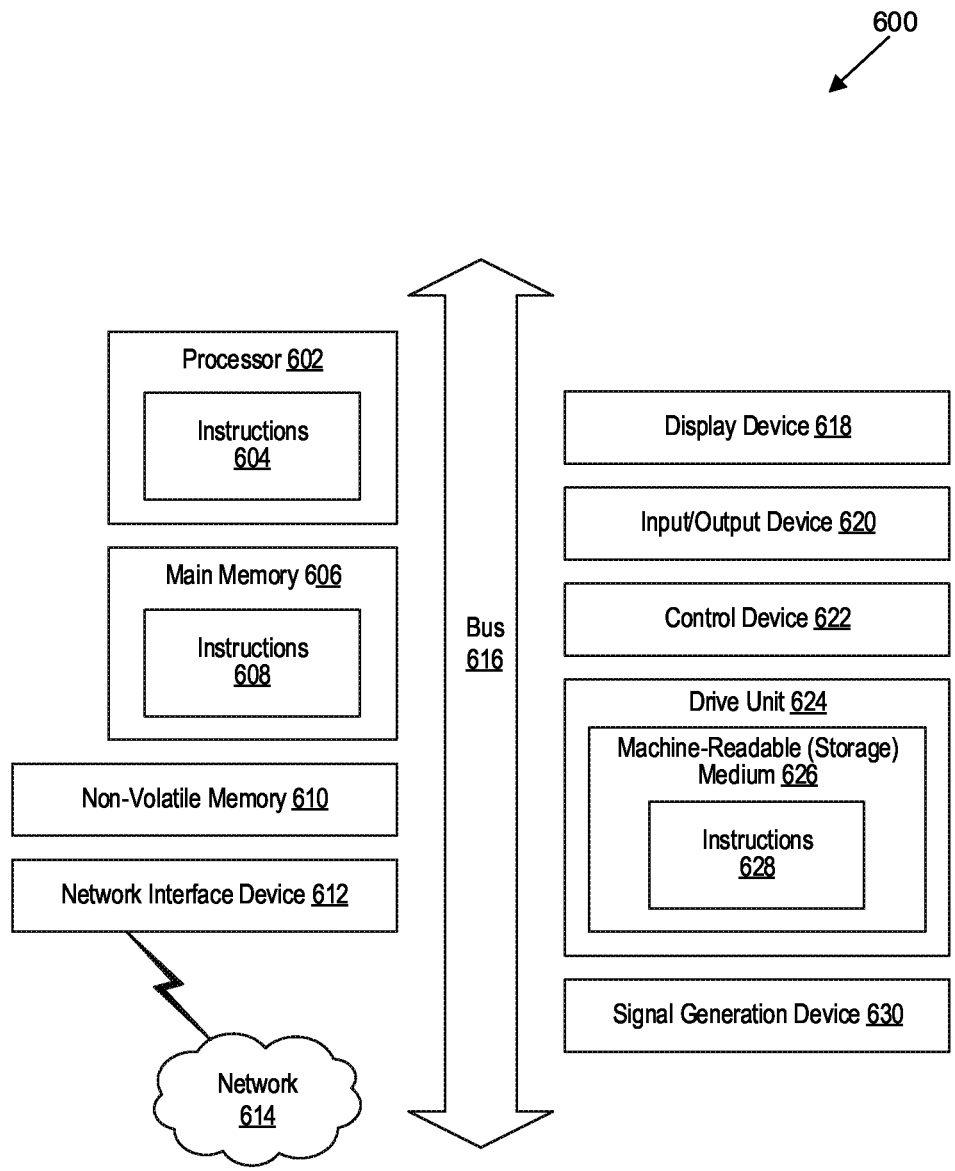
FIG. 6 is a block diagram that illustrates an example of a computer system in which at least some operations described herein can be implemented.

FIG. 6 is a block diagram that illustrates an example of a computer system 600 in which at least some operations described herein can be implemented. As shown, the computer system 600 can include: one or more processors 602, main memory 606, non-volatile memory 610, a network interface device 612, a video display device 618, an input/output device 620, a control device 622 (e.g., keyboard and pointing device), a drive unit 624 that includes a storage medium 626, and a signal generation device 630 that are communicatively connected to a bus 616. The bus 616 represents one or more physical buses and/or point-to-point connections that are connected by appropriate bridges, adapters, or controllers. Various common components (e.g., cache memory) are omitted from FIG. 6 for brevity. Instead, the computer system 600 is intended to illustrate a hardware device on which components illustrated or described relative to the examples of the figures and any other components described in this specification can be implemented.

The computer system 600 can take any suitable physical form. For example, the computer system 600 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 600. In some implementations, the computer system 600 can be an embedded computer system, a system-on-chip (SOC), a single-board computer system (SBC), or a distributed system such as a mesh of computer systems, or it can include one or more cloud components in one or more networks. Where appropriate, one or more computer systems 600 can perform operations in real time, in near real time, or in batch mode.

The network interface device 612 enables the computer system 600 to mediate data in a network 614 with an entity that is external to the computer system 600 through any communication protocol supported by the computer system 600 and the external entity. Examples of the network interface device 612 include a network adapter card, a wireless network interface card, a router, an access point, a wireless router, a switch, a multilayer switch, a protocol converter, a gateway, a bridge, a bridge router, a hub, a digital media receiver, and/or a repeater, as well as all wireless elements noted herein.

The memory (e.g., main memory 606, non-volatile memory 610, machine-readable medium 626) can be local, remote, or distributed. Although shown as a single medium, the machine-readable medium 626 can include multiple media (e.g., a centralized/distributed database and/or associated caches and servers) that store one or more sets of instructions 628. The machine-readable (storage) medium 626 can include any medium that is capable of storing, encoding, or carrying a set of instructions for execution by the computer system 600. The machine-readable medium 626 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 610, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 604, 608, 628) set at various times in various memory and storage devices in computing device(s). When read and executed by the processor 602, the instruction(s) cause the computer system 600 to perform operations to execute elements involving the various aspects of the disclosure.

Remarks

The terms "example," "embodiment," and "implementation" are used interchangeably. For example, references to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variants thereof mean any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms either in this application or in a continuing application.

I claim:

1. At least one computer-readable storage medium, excluding transitory signals and carrying instructions to adjust a configuration associated with a wireless telecommunication network, which, when executed by at least one data processor of a system, cause the system to:
   obtain the configuration associated with the wireless telecommunication network and a historical performance associated with the wireless telecommunication network,
      wherein the configuration relates to wireless performance of at least one cell site in the wireless telecommunication network;
   based on the historical performance, identify a time window associated with the wireless telecommunication network and a geographic location associated with the wireless telecommunication network,
      wherein the time window and the geographic location indicate an undesirable quality of service associated with the wireless telecommunication network;
   based on the configuration associated with the wireless telecommunication network and the historical performance, identify a parameter associated with the wireless telecommunication network, an adjustment to the parameter, a success or failure criterion, and a duration of deployment,
      wherein the parameter includes a tilt associated with an antenna, an azimuth associated with the antenna, a vertical beam width associated with the antenna, and a horizontal beam width associated with the antenna;
   based on the time window, the geographic location, and the duration of deployment, determine a testing time window during which to deploy and test the adjustment to the parameter,
      wherein the testing time window satisfies a density threshold indicating that at most 60% of a peak number of mobile devices active on the wireless telecommunication network are affected by the adjustment to the parameter;
   deploy the adjustment to the parameter at the geographic location during the testing time window;
   monitor a performance of the wireless telecommunication network during the testing time window; and,
      determine whether the failure criterion is satisfied; and either
      a) upon determining that the failure criterion is satisfied, terminate the adjustment to the parameter based on the performance of the wireless telecommunication network during the testing time window; or,
      b) based on the performance of the wireless telecommunication network, determine whether the success criterion is satisfied; and
      upon determining that the success criterion is satisfied, preserve the adjustment to the parameter.

2. The computer-readable storage medium of claim 1, the instructions to identify the parameter associated with the wireless telecommunication network, the adjustment to the parameter, and the success criterion comprising instructions to:
   obtain multiple parameters including the tilt associated with the antenna, the azimuth associated with the antenna, the vertical beam width associated with the antenna, the horizontal beam width associated with the antenna, and a feature associated with the antenna,
      wherein the feature can be activated or deactivated, and
      wherein the feature includes Multiple Input Multiple Output (MIMO), Time Division Duplex (TDD), Frequency Division Duplex (FDD), or Wi-Fi;

adjust at least one parameter among the multiple parameters;
simulate operation of the wireless telecommunication network upon adjusting the at least one parameter;
monitor a performance of the simulated wireless telecommunication network;
obtain a threshold indicating a deployable performance improvement;
determine whether the performance of the simulated wireless telecommunication network exceeds the deployable performance improvement; and
upon determining that the performance of the simulated wireless telecommunication network exceeds the deployable performance improvement, deploy the at least one parameter that has been adjusted.

3. The computer-readable storage medium of claim 1, the instructions to identify the parameter associated with the wireless telecommunication network, the adjustment to the parameter, and the success criterion comprising instructions to:
obtain multiple parameters including the tilt associated with the antenna, the azimuth associated with the antenna, the vertical beam width associated with the antenna, the horizontal beam width associated with the antenna, and a feature associated with the antenna, wherein the feature can be activated or deactivated, and wherein the feature includes Multiple Input Multiple Output (MIMO), Time Division Duplex (TDD), Frequency Division Duplex (FDD), or Wi-Fi;
obtain an analytic model indicating an influence of at least one parameter among the multiple parameters on the performance of the wireless telecommunication network;
adjust at least one parameter among the multiple parameters;
based on the analytic model, determine the influence of the adjustment of the at least one parameter on the performance of the wireless telecommunication network;
obtain a threshold indicating a deployable performance improvement;
determine whether a performance predicted by the analytic model exceeds the deployable performance improvement; and
upon determining that the performance of the wireless telecommunication network exceeds the deployable performance improvement, deploy the at least one parameter that has been adjusted.

4. The computer-readable storage medium of claim 1, the instructions to determine whether the success criterion is satisfied comprising instructions to:
obtain a threshold range indicating an improvement in the performance of the wireless telecommunication network;
determine whether the performance of the wireless telecommunication network during the testing time window satisfies the threshold range;
upon determining that the performance of the wireless telecommunication network during the testing time window satisfies the threshold range, revert the adjustment to the parameter;
upon reverting the adjustment to the parameter, repeat the adjustment to the parameter at a later time window;
determine whether the performance of the wireless telecommunication network during the later time window satisfies the threshold range; and
upon determining that the performance of the wireless telecommunication network during the later time window satisfies the threshold range, preserve the adjustment to the parameter.

5. The computer-readable storage medium of claim 1, comprising instructions to:
obtain failure criteria comprising a threshold associated with the performance of the wireless telecommunication network, a threshold number of impacted mobile devices and a type of mobile devices, and an emergency event;
determine whether the performance of the wireless telecommunication network is below the threshold, whether a number of impacted mobile devices associated with the type of mobile devices impacted exceeds the threshold number of impacted mobile devices, or whether the emergency event occurred; and
upon determining that at least one of the failure criteria is satisfied, terminate the adjustment to the parameter.

6. The computer-readable storage medium of claim 1, comprising instructions to:
based on the time window and the geographic location, determine whether the testing time window within the time window satisfying the density threshold exists;
upon determining that the testing time window within the time window satisfying the density threshold does not exist, reduce the adjustment to the parameter and the duration of deployment to obtain a reduced adjustment to the parameter and a reduced testing time window; and
iteratively perform instructions comprising:
deploy the reduced adjustment to the parameter at the geographic location during the reduced testing time window;
monitor the performance of the wireless telecommunication network during the testing time window;
based on the performance of the wireless telecommunication network, determine whether the success criterion is satisfied; and
upon determining that the success criterion is satisfied, increase the reduced adjustment to the parameter;
until the success criterion associated with full adjustment to the parameter is satisfied or the failure criterion is satisfied.

7. A system comprising:
at least one hardware processor; and
at least one non-transitory memory storing instructions, which, when executed by the at least one hardware processor, cause the system to:
obtain a configuration associated with a wireless telecommunication network and a historical performance associated with the wireless telecommunication network;
based on the historical performance, identify a time window associated with the wireless telecommunication network and a geographic location associated with the wireless telecommunication network,
wherein the time window and the geographic location indicate an undesirable quality of service associated with the wireless telecommunication network;
based on the configuration associated with the wireless telecommunication network and the historical performance, identify a parameter associated with the wireless telecommunication network, an adjustment to the parameter, a success criterion, a failure criterion, and a duration of deployment;

based on the time window, the geographic location, and the duration of deployment, determine a testing time window during which to deploy and test the adjustment to the parameter,
    wherein the testing time window satisfies a density threshold indicating that at most 60% of a peak number of mobile devices active on the wireless telecommunication network are affected by the adjustment to the parameter;
deploy the adjustment to the parameter at the geographic location during the testing time window;
monitor a performance of the wireless telecommunication network during the testing time window; and either:
a) determine whether the failure criterion is satisfied;
upon determining that the failure criterion is satisfied, terminate the adjustment to the parameter based on the performance of the wireless telecommunication network during the testing time window; or
b) based on the performance of the wireless telecommunication network, determine whether the success criterion is satisfied; and
upon determining that the success criterion is satisfied, preserve the adjustment to the parameter.

8. The system of claim 7, the instructions to identify the parameter associated with the wireless telecommunication network, the adjustment to the parameter, and the success criterion comprising instructions to:
obtain multiple parameters including a tilt associated with an antenna, an azimuth associated with the antenna, a vertical beam width associated with the antenna, a horizontal beam width associated with the antenna, and a feature associated with the antenna,
    wherein the feature can be activated or deactivated, and
    wherein the feature includes Multiple Input Multiple Output (MIMO), Time Division Duplex (TDD), Frequency Division Duplex (FDD), or Wi-Fi;
adjust at least one parameter among the multiple parameters;
simulate operation of the wireless telecommunication network upon adjusting the at least one parameter;
monitor a performance of the simulated wireless telecommunication network;
obtain a threshold indicating a deployable performance improvement;
determine whether the performance of the simulated wireless telecommunication network exceeds the deployable performance improvement; and
upon determining that the performance of the simulated wireless telecommunication network exceeds the deployable performance improvement, deploy the at least one parameter that has been adjusted.

9. The system of claim 7, the instructions to identify the parameter associated with the wireless telecommunication network, the adjustment to the parameter, and the success criterion comprising instructions to:
obtain multiple parameters including a tilt associated with an antenna, an azimuth associated with the antenna, a vertical beam width associated with the antenna, a horizontal beam width associated with the antenna, and a feature associated with the antenna,
wherein the feature can be activated or deactivated, and
wherein the feature includes Multiple Input Multiple Output (MIMO), Time Division Duplex (TDD), Frequency Division Duplex (FDD), or Wi-Fi;
obtain an analytic model indicating an influence of at least one parameter among the multiple parameters on the performance of the wireless telecommunication network;
adjust at least one parameter among the multiple parameters;
based on the analytic model, determine the influence of the adjustment of the at least one parameter on the performance of the wireless telecommunication network;
obtain a threshold indicating a deployable performance improvement;
determine whether a performance predicted by the analytic model exceeds the deployable performance improvement; and
upon determining that the performance of the wireless telecommunication network exceeds the deployable performance improvement, deploy the at least one parameter that has been adjusted.

10. The system of claim 7, the instructions to determine whether the success criterion is satisfied comprising instructions to:
obtain a threshold range indicating an improvement in the performance of the wireless telecommunication network;
determine whether the performance of the wireless telecommunication network during the testing time window satisfies the threshold range;
upon determining that the performance of the wireless telecommunication network during the testing time window satisfies the threshold range, revert the adjustment to the parameter;
upon reverting the adjustment to the parameter, repeat the adjustment to the parameter at a later time window;
determine whether the performance of the wireless telecommunication network during the later time window satisfies the threshold range; and
upon determining that the performance of the wireless telecommunication network during the later time window satisfies the threshold range, preserve the adjustment to the parameter.

11. The system of claim 7, comprising instructions to:
obtain failure criteria comprising a threshold associated with the performance of the wireless telecommunication network, a threshold number of impacted UEs and a type of UEs, and an emergency event;
determine whether the performance of the wireless telecommunication network is below the threshold, whether a number of impacted UEs associated with the type of UEs impacted exceeds the threshold number of impacted UEs, or whether the emergency event occurred; and
upon determining that at least one of the failure criteria is satisfied, terminate the adjustment to the parameter.

12. The system of claim 7, comprising instructions to:
based on the time window and the geographic location, determine whether the testing time window within the time window satisfying the density threshold exists,
    wherein the density threshold comprises a number of UEs impacted by the parameter associated with the wireless telecommunication network, or a number of UEs having the undesirable quality of service associated with the wireless telecommunication network;
upon determining that the testing time window within the time window satisfying the density threshold does not exist, reduce the adjustment to the parameter and the duration of deployment to obtain a reduced adjustment to the parameter and a reduced testing time window; and iteratively perform instructions comprising:
deploy the reduced adjustment to the parameter at the geographic location during the reduced testing time window;
monitor the performance of the wireless telecommunication network during the testing time window;
based on the performance of the wireless telecommunication network, determine whether the success criterion is satisfied; and
upon determining that the success criterion is satisfied, increase the reduced adjustment to the parameter;
until the success criterion associated with full adjustment to the parameter is satisfied or the failure criterion is satisfied.

13. The system of claim 7, wherein the density threshold comprises a number of UEs impacted by the adjustment to the parameter associated with the wireless telecommunication network, or a number of UEs having the undesirable quality of service associated with the wireless telecommunication network.

14. The system of claim 7, wherein the parameter includes a tilt associated with an antenna, an azimuth associated with the antenna, a vertical beam width associated with the antenna, and a horizontal beam width associated with the antenna.

15. A system comprising:
at least one hardware processor; and
at least one non-transitory memory storing instructions, which, when executed by the at least one hardware processor, cause the system to:
based on a historical performance, identify a time window associated with a wireless telecommunication network and a location associated with the wireless telecommunication network,
wherein the time window and the location indicate an undesirable quality of service associated with the wireless telecommunication network;
based on a configuration associated with the wireless telecommunication network and the historical performance associated with the wireless telecommunication network, identify at least three of: a parameter associated with the wireless telecommunication network, an adjustment to the parameter, a success criterion, a failure criterion, or a duration of deployment;
determine whether a testing time window within the time window satisfying a density threshold exists,
wherein the density threshold indicates that at most 60% of a peak number of mobile devices active on the wireless telecommunication network are affected by the adjustment to the parameter;
upon determining that the testing time window within the time window satisfying the density threshold does not exist, reduce the adjustment to the parameter or the duration of deployment to obtain a reduced adjustment to the parameter or a reduced testing time window; and
iteratively perform instructions comprising:
deploy the reduced adjustment to the parameter or the reduced testing time window;
monitor a performance of the wireless telecommunication network; and
based on the performance of the wireless telecommunication network, determine whether the success or failure criterion is satisfied; and
upon determining that the success criterion is satisfied, perform a modification to the parameter or to the adjustment of the parameter;
until the success criterion associated with full adjustment to the parameter is satisfied or the failure criterion is satisfied.

16. The system of claim 15, the instructions to identify the parameter associated with the wireless telecommunication network, the adjustment to the parameter, and the success criterion comprising instructions to:
obtain multiple parameters including a tilt associated with an antenna, an azimuth associated with the antenna, a vertical beam width associated with the antenna, a horizontal beam width associated with the antenna, and a feature associated with the antenna,
wherein the feature can be activated or deactivated, and
wherein the feature includes Multiple Input Multiple Output (MIMO), Time Division Duplex (TDD), Frequency Division Duplex (FDD), or Wi-Fi;
adjust at least one parameter among the multiple parameters;
simulate operation of the wireless telecommunication network upon adjusting the at least one parameter;
monitor a performance of the simulated wireless telecommunication network;
obtain a threshold indicating a deployable performance improvement;
determine whether the performance of the simulated wireless telecommunication network exceeds the deployable performance improvement; and
upon determining that the performance of the simulated wireless telecommunication network exceeds the deployable performance improvement, deploy the at least one parameter that has been adjusted.

17. The system of claim 15, the instructions to identify the parameter associated with the wireless telecommunication network, the adjustment to the parameter, and the success criterion comprising instructions to:
obtain multiple parameters including a tilt associated with an antenna, a azimuth associated with the antenna, a vertical beam width associated with the antenna, a horizontal beam width associated with the antenna, and a feature associated with the antenna,
wherein the feature can be activated or deactivated, and
wherein the feature includes Multiple Input Multiple Output (MIMO), Time Division Duplex (TDD), Frequency Division Duplex (FDD), or Wi-Fi;
obtain an analytic model indicating an influence of at least one parameter among the multiple parameters on the performance of the wireless telecommunication network;
adjust at least one parameter among the multiple parameters;
based on the analytic model, determine the influence of the adjustment of the at least one parameter on the performance of the wireless telecommunication network;
obtain a threshold indicating a deployable performance improvement;
determine whether a performance predicted by the analytic model exceeds the deployable performance improvement; and
upon determining that the performance of the wireless telecommunication network exceeds the deployable performance improvement, deploy the at least one parameter that has been adjusted.

18. The system of claim 15, the instructions to determine whether the success criterion is satisfied comprising instructions to:
- obtain a threshold range indicating an improvement in the performance of the wireless telecommunication network;
- determine whether the performance of the wireless telecommunication network during the testing time window satisfies the threshold range;
- upon determining that the performance of the wireless telecommunication network during the testing time window satisfies the threshold range, revert the adjustment to the parameter;
- upon reverting the adjustment to the parameter, repeat the adjustment to the parameter at a later time window;
- determine whether the performance of the wireless telecommunication network during the later time window satisfies the threshold range; and
- upon determining that the performance of the wireless telecommunication network during the later time window satisfies the threshold range, preserve the adjustment to the parameter.

19. The system of claim 15, comprising instructions to:
- obtain failure criteria comprising a threshold associated with the performance of the wireless telecommunication network, a threshold number of impacted UEs and a type of UEs, and an emergency event;
- determine whether the performance of the wireless telecommunication network is below the threshold, whether a number of impacted UEs associated with the type of UEs impacted exceeds the threshold number of impacted UEs, or whether the emergency event occurred; and
- upon determining that the failure criterion is satisfied, terminate the adjustment to the parameter.

20. The system of claim 15, wherein the parameter includes a tilt associated with an antenna, an azimuth associated with the antenna, a vertical beam width associated with the antenna, and a horizontal beam width associated with the antenna.

* * * * *